(12) United States Patent
Lee et al.

(10) Patent No.: US 10,992,847 B2
(45) Date of Patent: Apr. 27, 2021

(54) IMAGE DEVICE FOR GENERATING A 360 DEGREE DEPTH MAP

(71) Applicant: eYs3D Microelectronics, Co., Taipei (TW)

(72) Inventors: Chi-Feng Lee, Hsinchu County (TW); Chao-Chun Lu, Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 71 days.

(21) Appl. No.: 15/989,214

(22) Filed: May 25, 2018

(65) Prior Publication Data

US 2018/0376129 A1   Dec. 27, 2018

Related U.S. Application Data

(60) Provisional application No. 62/511,317, filed on May 25, 2017.

(51) Int. Cl.

| | |
|---|---|
| *H04N 5/225* | (2006.01) |
| *H04N 13/271* | (2018.01) |
| *H04N 13/156* | (2018.01) |
| *H04N 13/232* | (2018.01) |
| *H04N 13/243* | (2018.01) |
| *H04N 5/232* | (2006.01) |
| *H04N 5/247* | (2006.01) |
| *G01B 11/24* | (2006.01) |
| *H04N 5/222* | (2006.01) |
| *G06T 7/521* | (2017.01) |
| *G06T 7/55* | (2017.01) |
| *H04N 13/128* | (2018.01) |
| *G09G 5/02* | (2006.01) |

(52) U.S. Cl.
CPC ........... *H04N 5/2258* (2013.01); *G01B 11/24* (2013.01); *G06T 7/521* (2017.01); *G06T 7/55* (2017.01); *G09G 5/028* (2013.01); *H04N 5/2226* (2013.01); *H04N 5/2251* (2013.01); *H04N 5/23229* (2013.01); *H04N 5/23238* (2013.01); *H04N 5/247* (2013.01); *H04N 13/128* (2018.05); *H04N 13/156* (2018.05); *H04N 13/232* (2018.05); *H04N 13/243* (2018.05); *H04N 13/271* (2018.05)

(58) Field of Classification Search
CPC .......... H04N 13/271; H04N 2013/0081; G06T 7/593

See application file for complete search history.

(56) References Cited

U.S. PATENT DOCUMENTS 9,479,697 B2 * 10/2016 Aguilar .............. H04N 5/23238
2013/0250040 A1 * 9/2013 Vitsnudel ............. H04N 13/239
348/36

(Continued)

FOREIGN PATENT DOCUMENTS

| TW | 201717613 A | 5/2017 |
|---|---|---|
| WO | 2016/179694 A1 | 11/2016 |
| WO | 2017/026705 A1 | 2/2017 |

*Primary Examiner* — Rebecca A Volentine
(74) *Attorney, Agent, or Firm* — Winston Hsu (57) ABSTRACT

An image device for generating a 360 degree depth map includes a plurality of image capturers, wherein an image pair captured by each two adjacent image capturers of the plurality of image capturers is used for generating the 360 degree depth map, and a sum of all view angles of the plurality of image capturers is not less than 720 degree.

9 Claims, 7 Drawing Sheets

(56) References Cited

U.S. PATENT DOCUMENTS

| | | | |
|---|---|---|---|
| 2015/0054913 A1* | 2/2015 | Annau | H04N 13/271 |
| | | | 348/36 |
| 2016/0119541 A1* | 4/2016 | Alvarado-Moya | G06T 3/4038 |
| | | | 348/38 |
| 2016/0295108 A1* | 10/2016 | Cao | H04N 5/23238 |
| 2017/0272698 A1* | 9/2017 | Liu | G06T 3/4038 |
| 2018/0139431 A1* | 5/2018 | Simek | H04N 5/2258 |
| 2018/0143523 A1* | 5/2018 | Chapdelaine-Couture | |
| | | | H04N 13/271 |
| 2018/0278916 A1* | 9/2018 | Kim | G06T 7/596 |
| 2018/0302614 A1* | 10/2018 | Toksvig | H04N 5/23229 |

* cited by examiner

IMAGE DEVICE FOR GENERATING A 360 DEGREE DEPTH MAP

CROSS REFERENCE TO RELATED APPLICATION

This application claims the benefit of U.S. Provisional Application No. 62/511,317, filed on May 25, 2017 and entitled "System and Camera with Panoramic Image and Depth Information," the contents of which are incorporated herein by reference.

BACKGROUND OF THE INVENTION

1. Field of the Invention

The present invention relates to an image device for generating a 360 degree depth map, and particularly to an image device that can utilize a plurality of fisheye image capturers which have a sum of view angles not less than 720 degree to generate a panorama depth map or a spherical depth map.

2. Description of the Prior Art

In the prior art, an image device can utilize at least three image capturer pairs to generate a panorama depth map. For example, the image device utilizes 3 image capturer pairs arranged in a triangle to generate the panorama depth map. In addition, the image device can utilize at least four image capturers to generate a spherical depth map. For example, the image device utilizes 4 image capturer pairs arranged in a tetrahedron to generate the spherical depth map. Although the image device can utilize the above-mentioned image capturer pairs to generate the panorama depth map or the spherical depth map, the image device needs more image capturers (e.g. needing at least 6 image capturers to generate the panorama depth map, and needing at least 8 image capturers to generate the spherical depth map), resulting cost of the image device being increased. Therefore, how to reduce the cost of the image device becomes an important issue for a designer of the image device.

SUMMARY OF THE INVENTION

An embodiment of the present invention provides an image device for generating a 360 degree depth map. The image device includes a plurality of image capturers, wherein an image pair captured by each two adjacent image capturers of the plurality of image capturers is used for generating the 360 degree depth map, and a sum of all view angles of the plurality of image capturers is not less than 720 degree.

Another embodiment of the present invention provides an image device for generating a 360 degree depth map. The image device includes a plurality of image capturers, wherein when overlapping vision fields exist between the plurality of image capturers cover 360 degree, images corresponding to the overlapping vision fields are used for generating the 360 degree depth map The present invention provides an image device. The image device utilizes a plurality of fisheye image capturers which have a sum of view angles not less than 720 degree to generate a panorama depth map or a spherical depth map, or when overlapping vision fields between the plurality of fisheye image capturers cover 360 degree, the image device utilizes images corresponding to the overlapping vision fields to generate the panorama depth map. Therefore, the present invention can effectively reduce a number of the plurality of fisheye image capturers to reduce cost of the image device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
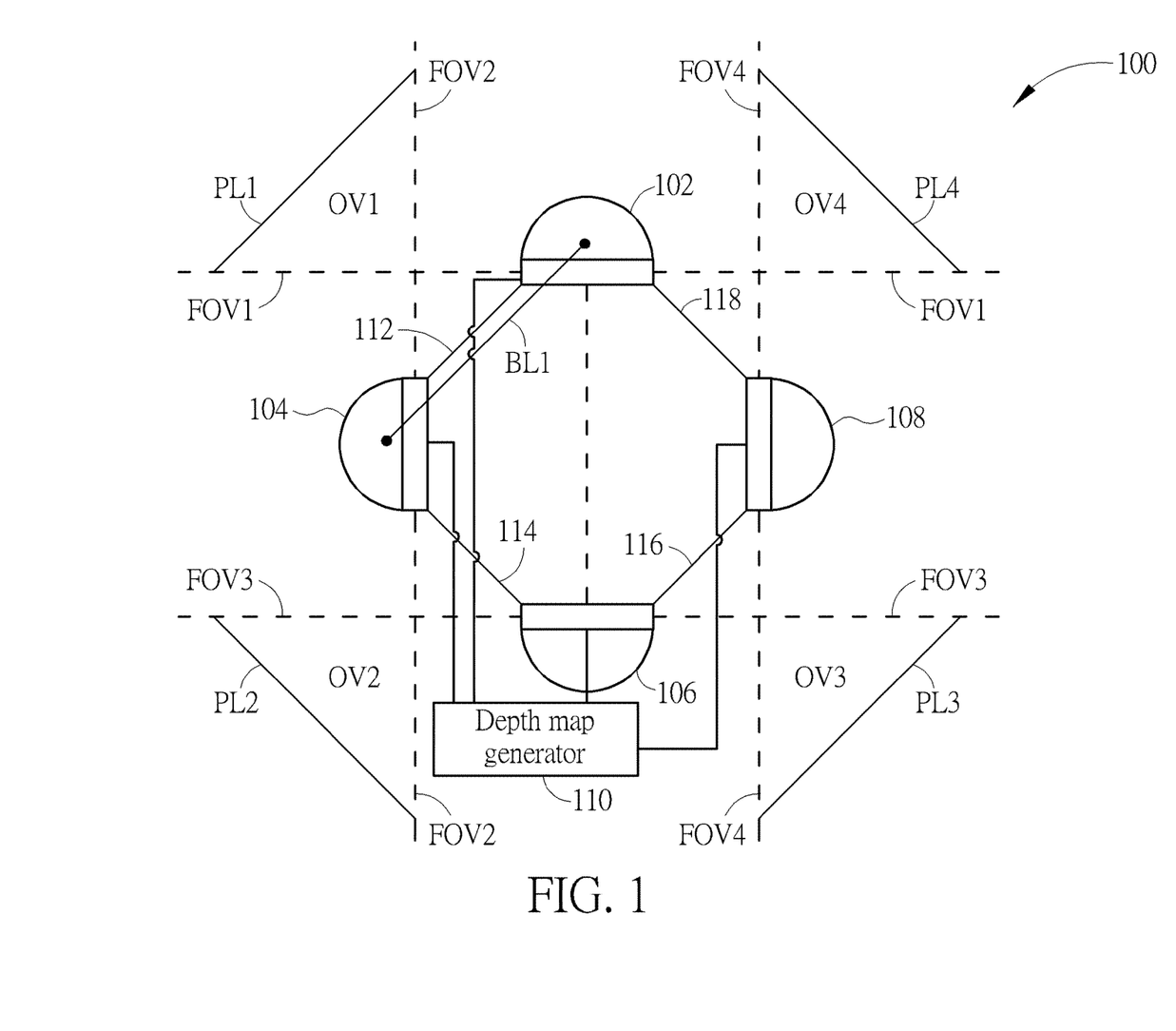
FIG. 1 is a diagram illustrating an image device for generating a 360 degree depth map according to a first embodiment of the present invention.

Please refer to FIG. 1. FIG. 1 is a diagram illustrating an image device 100 for generating a 360 degree depth map according to a first embodiment of the present invention, wherein the image device 100 includes image capturers 102, 104, 106, 108 and a depth map generator 110, support units 112-118 are used for supporting the image capturers 102, 104, 106, 108, the depth map generator 110 is coupled to the image capturers 102, 104, 106, 108, and the image capturers 102, 104, 106, 108 are fisheye image capturers. But, the present invention is not limited to an amount of the support units 112-118 and a shape formed by the support units 112-118 shown in FIG. 1. As shown in FIG. 1, when view angles of the image capturers 102, 104, 106, 108 are the same, a sum of the view angles of the image capturers 102, 104, 106, 108 is not less than 720 degree, wherein a minimum view angle MFOV of each image capturer of the image capturers 102, 104, 106, 108 is determined by equation (1):

$$MFOV = 720/N + EA \qquad (1)$$

As shown in equation (1), N is equal to 4, and EA is an angle required for compensating an assembly error of the each image capturer of the image capturers 102, 104, 106, 108.

Therefore, if the each image capturer is an ideal image capturer (that is, an angle EA corresponding to the each image capturer is equal to 0) and the view angles of the image capturers 102, 104, 106, 108 are the same, the minimum view angle MFOV of the each image capturer of the image capturers 102, 104, 106, 108 is equal to 180 degree. As shown in FIG. 1, an image overlapping area OV1 exists between a view angle FOV1 of the image capturer 102 and a view angle FOV2 of the image capturer 104, so a first image pair exists between images captured by the image capturer 102 and the image capturer 104, wherein the first image pair corresponds to the image overlapping area OV1, and the first image pair has depth information corresponding to the image overlapping area OV1. Similarly, a second image pair (corresponding to an image overlapping area OV2) exists between images captured by the image capturer 104 and the image capturer 106, a third image pair (corresponding to an image overlapping area OV3) exists between images captured by the image capturer 106 and the image capturer 108, and a fourth image pair (corresponding to an image overlapping area OV4) exists between images captured by the image capturer 108 and the image capturer 102, wherein the second image pair has depth information corresponding to the image overlapping area OV2, the third image pair has depth information corresponding to the image overlapping area OV3, and the fourth image pair has depth information corresponding to the image overlapping area OV4.

As shown in FIG. 1, the first image pair can be first projected into a projection plane PL1 to generate a projection image pair by a plane projection method, wherein the projection plane PL1 is parallel to a plane where a baseline BL1 between the image capturer 102 and the image capturer 104 exists. In addition, the plane projection method is obvious to one of ordinary skill in the art, so further description thereof is omitted for simplicity. Similarly, the second image pair can be first projected into a projection plane PL2 to generate a second projection image pair by the plane projection method, the third image pair can be first projected into a projection plane PL3 to generate a third projection image pair by the plane projection method, and the fourth image pair can be first projected into a projection plane PL4 to generate a fourth projection image pair by the plane projection method. Therefore, after the first projection image pair, the second projection image pair, the third projection image pair, and the fourth projection image pair are generated, the depth map generator 110 can generate a panorama depth map according to the first projection image pair, the second projection image pair, the third projection image pair, and the fourth projection image pair.

In addition, the image device 100 can further include at least one light source (not shown in FIG. 1) for emitting at least one structured light, wherein the structured light is used for increasing quality of the panorama depth map.

In addition, because the view angles of the image capturers 102, 104, 106, 108 are the same, the image capturers 102, 104, 106, 108 are arranged in a square, and the minimum view angle MFOV of the each image capturer (ideal image capturer) of the image capturers 102, 104, 106, 108 is equal to 180 degree. But, in another embodiment of the present invention, a part or all of the view angles of the image capturers 102, 104, 106, 108 are different. Meanwhile, the image capturers 102, 104, 106, 108 can be arranged in a quadrilateral (not a square) to make the depth map generator 110 generate the panorama depth map covering 360 degree according to each projection image pair.

In addition, the image capturers 102, 104, 106, 108 can be cameras, or complementary metal-oxide-semiconductor image sensors, or charge coupled device image sensors. In addition, the depth map generator 110 can be a field programmable gate array (FPGA) with the above-mentioned functions of the depth map generator 110, or an application-specific integrated circuit (ASIC) with the above-mentioned functions of the depth map generator 110, or a software module with the above-mentioned functions of the depth map generator 110.

In addition, if the image device 100 is not limited to only including the image capturers 102, 104, 106, 108 (that is, the image device 100 includes at least five image capturers), the each image capturer of the image device 100 can be a non-fisheye image capturer (because the view angle of the each image capturer of the image device 100 can be less than 180 degree).

Figure 2:
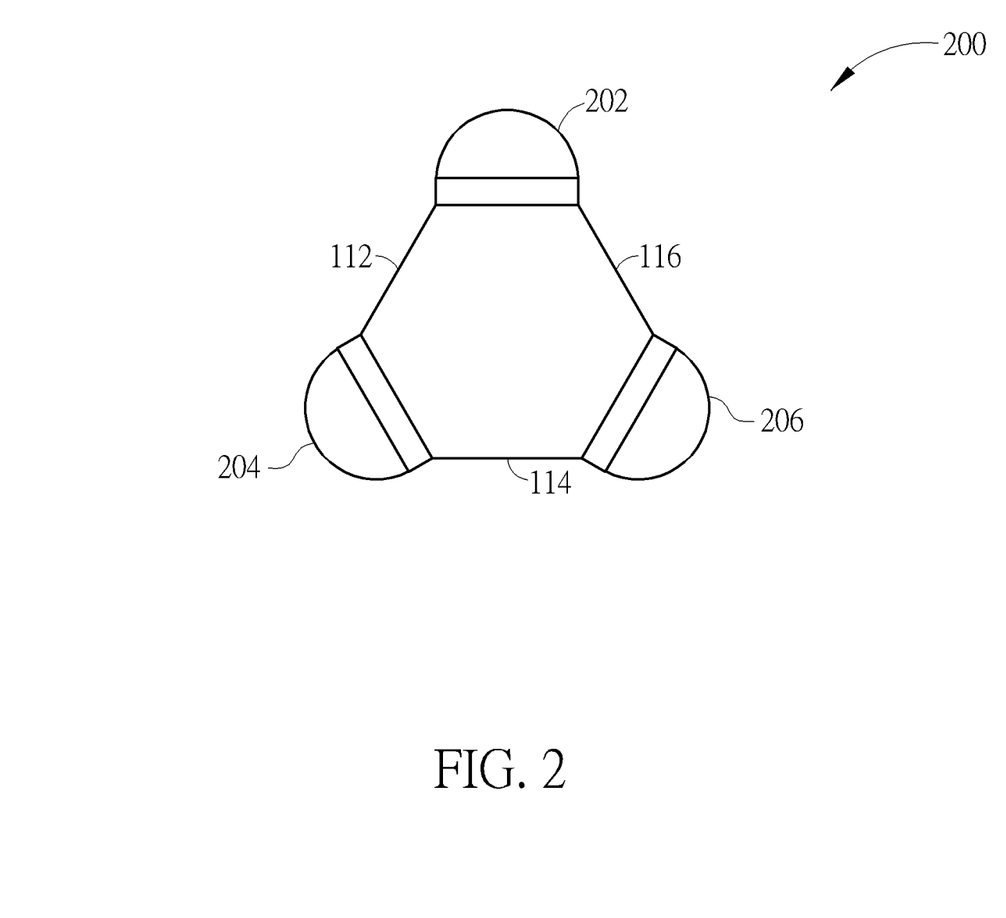
FIG. 2 is a diagram illustrating an image device for generating a 360 degree depth map according to another embodiment of the present invention.

In addition, in another embodiment of the present invention, as shown in FIG. 2, an image device 200 includes image capturers 202, 204, 206, the image capturers 202, 204, 206 are fisheye image capturers, and a sum of all view angles of the image capturers 202, 204, 206 is not less than 720 degree. If each image capturer of the image capturers 202, 204, 206 is an ideal image capturer and view angles of the image capturers 202, 204, 206 are the same, a minimum view angle MFOV of the each image capturer of the image capturers 202, 204, 206 is equal to 240 degree. In addition, an operational principle of the image device 200 for generating a panorama depth map can be referred to the above-mentioned operational principle of the image device 100 for generating the panorama depth map, so further description thereof is omitted for simplicity.

Figure 3:
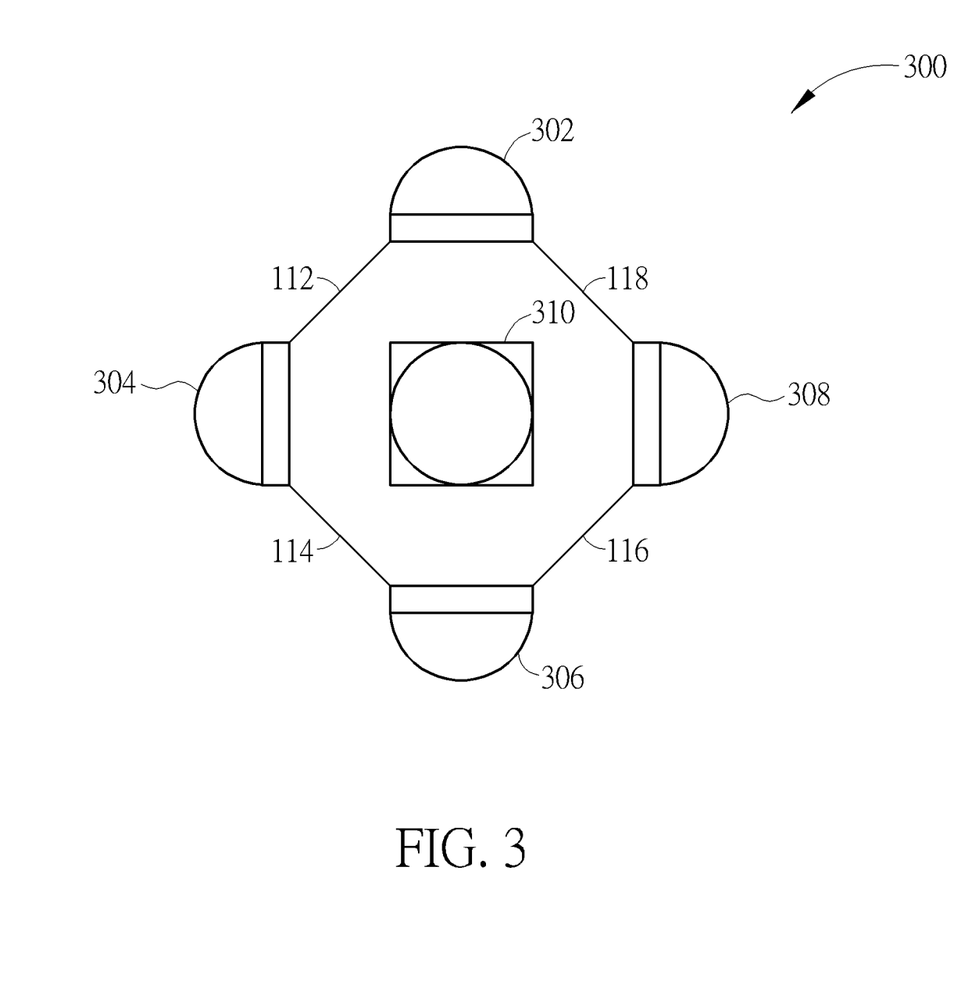
FIG. 3 is a diagram illustrating an image device for generating a 360 degree depth map according to a second embodiment of the present invention.

Please refer to FIG. 3. FIG. 3 is a diagram illustrating a top view of an image device 300 for generating a 360 degree depth map according to a second embodiment of the present invention, and the image device 300 includes image capturers 302, 304, 306, 308, 310, 312 and the depth map generator 110, wherein the image capturer 312 is covered by the image capturer 310, so FIG. 3 does not show the image capturer 312. In addition, for simplifying FIG. 3, FIG. 3 does also not show the depth map generator 110 and support units corresponding to the image capturers 310, 312. As shown in FIG. 3, if each image capturer of the image capturers 302, 304, 306, 308, 310, 312 is an ideal image capturer and view angles of the image capturers 302, 304, 306, 308, 310, 312 are the same, the each image capturer of the image capturers 302, 304, 306, 308, 310, 312 is located at a center of a corresponding plane (not shown in FIG. 3) of a hexahedron. As shown in FIG. 3, the depth map generator 110 can utilize the image capturers 302, 304, 306, 308 to generate a first panorama depth map according to the above-mentioned operational principle of the image device 100 for generating the panorama depth map, and utilize the image capturers 302, 306, 310, 312 to generate a second panorama depth map according to the above-mentioned operational principle of the image device 100 for generating the panorama depth map, wherein because a first plane where the image capturers 302, 304, 306, 308 are located is perpendicular to a second plane where the image capturers 302, 306, 310, 312 are located, a shape of the first panorama depth map can be the same as a shape of the second panorama depth map, but the first panorama depth map corresponds to the view angles of the image capturers 302, 304, 306, 308 and the second panorama depth map corresponds to the view angles of the image capturers 302, 306, 310, 312. Therefore, after the depth map generator 110 generates the first panorama depth map and the second panorama depth map, the depth map generator 110 can combine the first panorama depth map with the second panorama depth map to generate a spherical depth map. In addition, subsequent operational principles of the image device 300 are the same as those of the image device 100, so further description thereof is omitted for simplicity.

Figure 4:
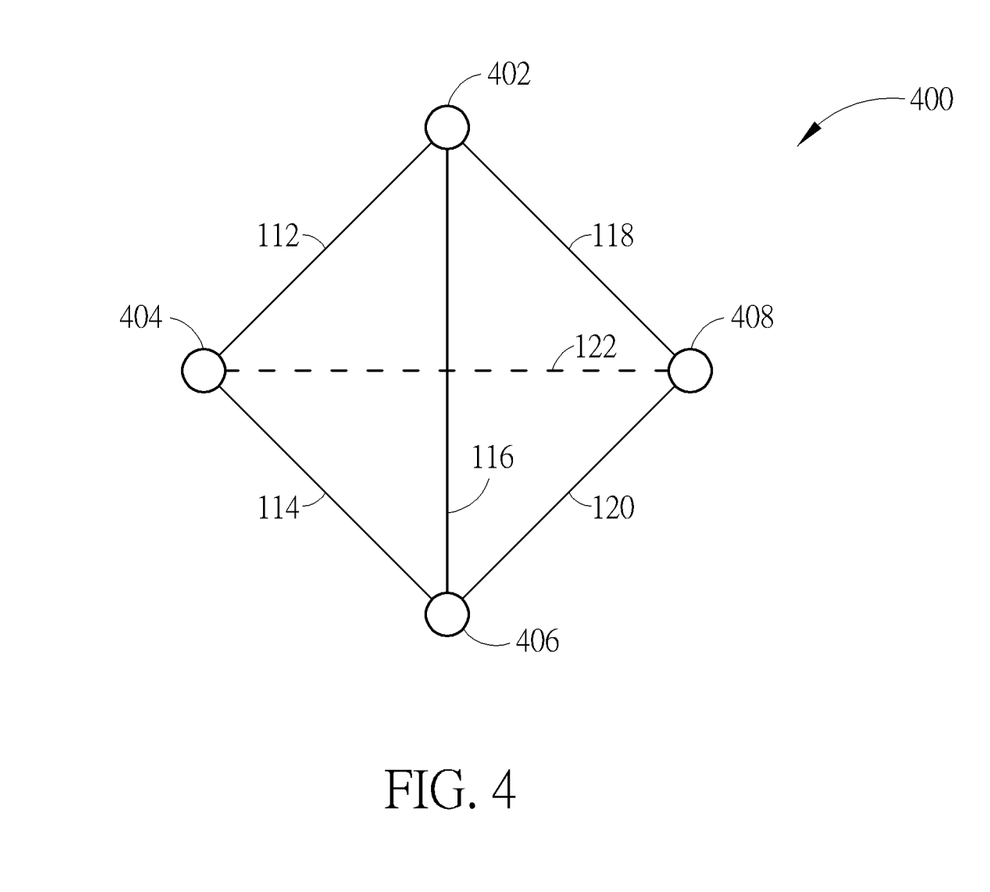
FIG. 4 is a diagram illustrating an image device for generating a 360 degree depth map according to another embodiment of the present invention.

In addition, the image device 300 is not limited to including the image capturers 302, 304, 306, 308, 310, 312. That is, in another embodiment of the present invention, as shown in FIG. 4, an image device 400 includes 4 image capturers 402, 404, 406, 408, the image capturers 402, 404, 406, 408 are fisheye image capturers, a sum of view angles of the image capturers 402, 404, 406, 408 is not less than 720 degree, the image capturers 402, 404, 406, 408 are arranged in a tetrahedron, and support units 112-122 are used for supporting the image capturers 402, 404, 406, 408. In addition, an operational principle of the image device 400 for generating a spherical depth map can be referred to the above-mentioned operational principle of the image device 100 for generating the panorama depth map, so further description thereof is omitted for simplicity.

Figure 5:
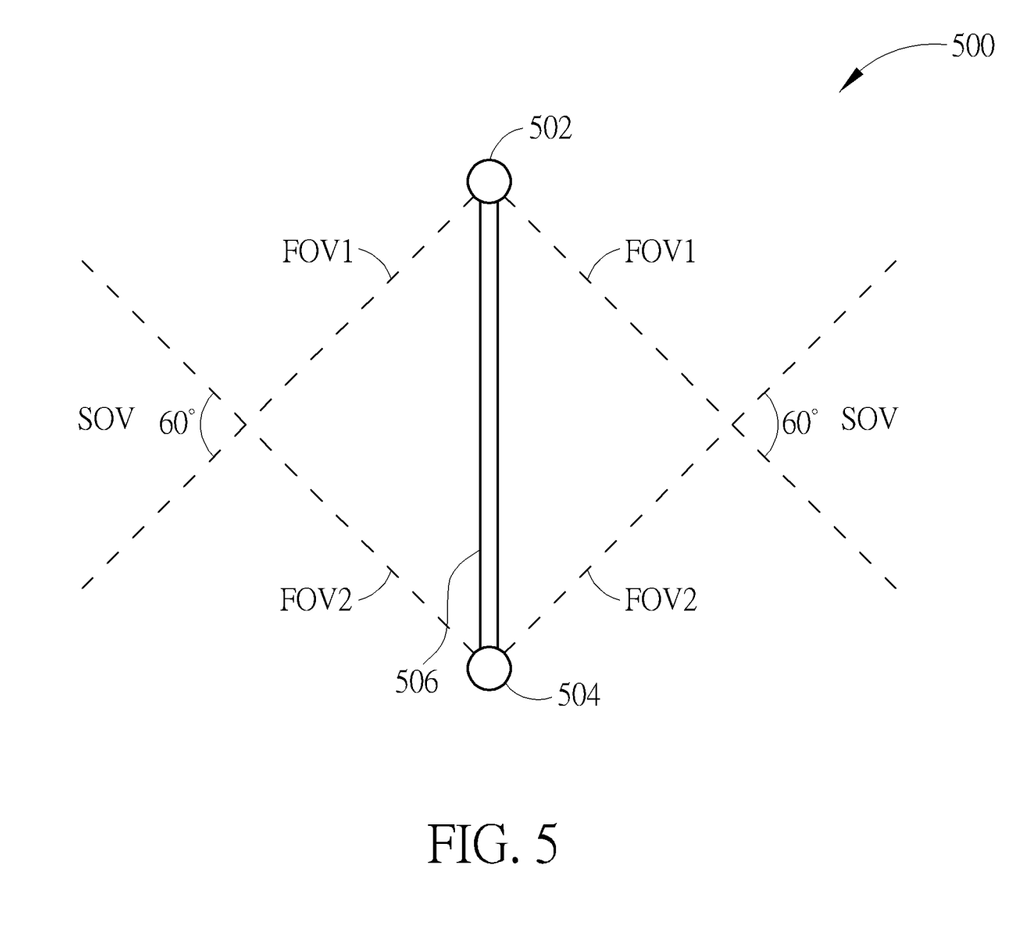
FIG. 5 is a diagram illustrating an image device for generating a 360 degree depth map according to a third embodiment of the present invention.

Please refer to FIG. 5. FIG. 5 is a diagram illustrating an image device 500 for generating a 360 degree depth map according to a third embodiment of the present invention. As shown in FIG. 5, the image device 500 includes image capturers 502, 504 and the depth map generator 110, wherein for simplifying FIG. 5, FIG. 5 does not show the depth map generator 110. In addition, a support unit 506 exists between the image capturers 502, 504. If a minimum view angle MFOV of each image capturer of the image capturers 502, 504 is equal to 240 degree, a ring image overlapping area SOV exists between a view angle FOV1 of the image capturer 502 and a view angle FOV2 of the image capturer 504, wherein FIG. 5 only shows a cross section of the ring image overlapping area SOV, and the cross section corresponds to a 60 degree angle. Therefore, the depth map generator 110 of the image device 500 can utilize the ring image overlapping area SOV to generate a panorama depth map according to the above-mentioned operational principle of the image device 100 for generating the panorama depth map. In addition, subsequent operational principles of the image device 500 can be referred to the above-mentioned operational principle of the image device 100, so further description thereof is omitted for simplicity.

Figure 6A:
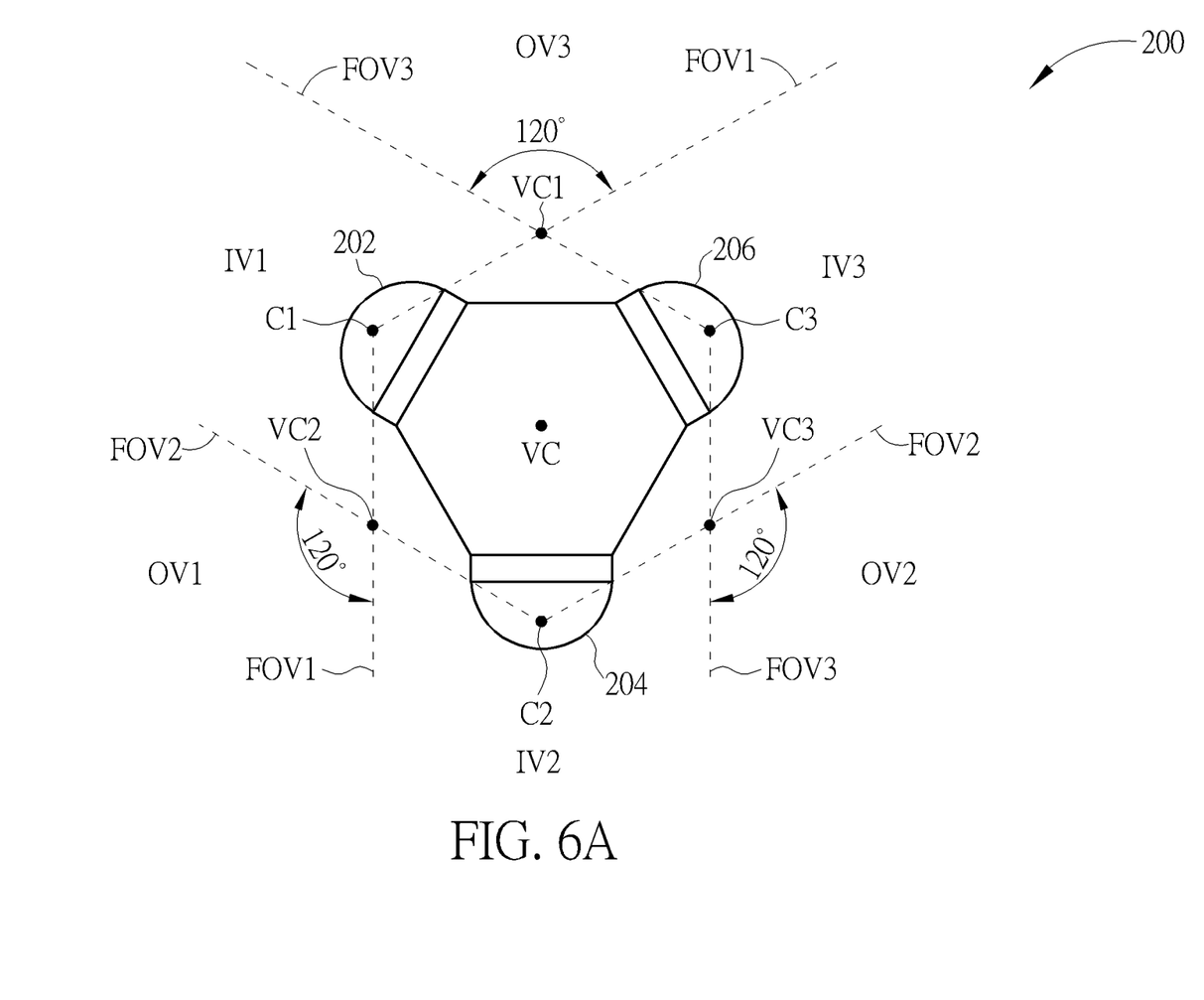
FIG. 6A is a diagram illustrating utilizing a non-plane projection method to obtain a spherical depth map.
Figure 6B:
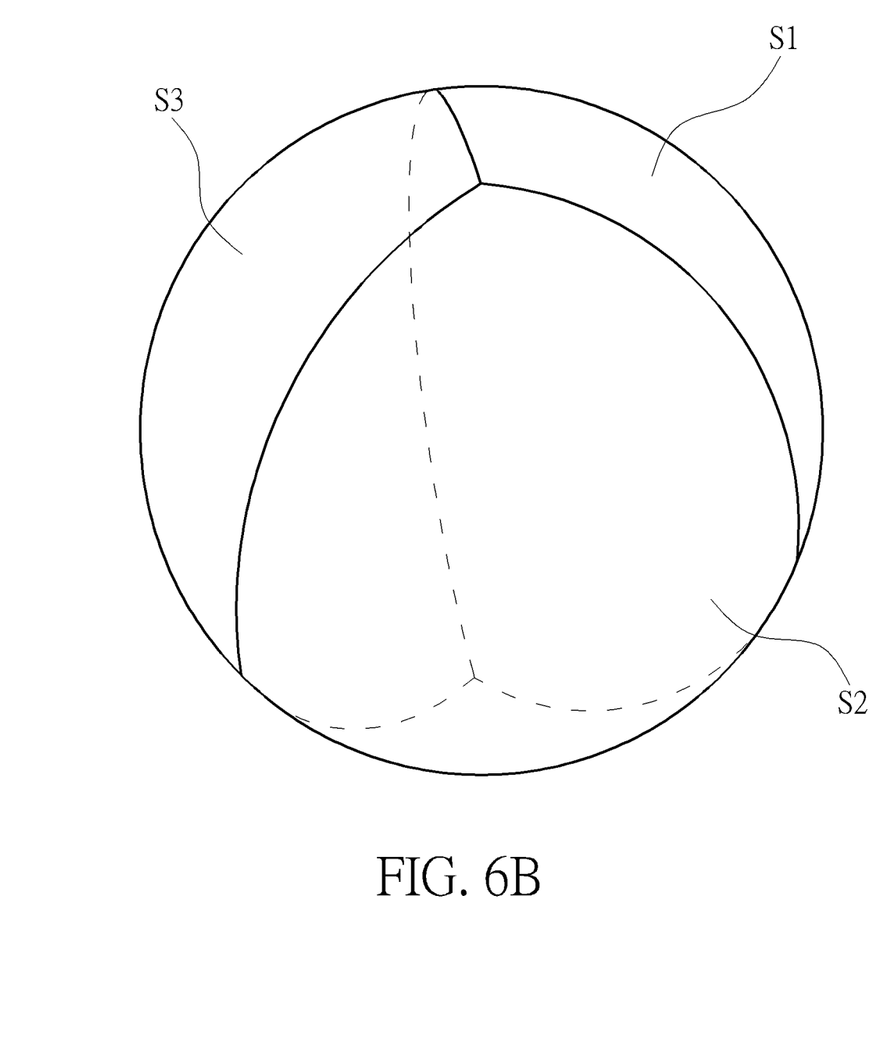
FIG. 6B is a diagram illustrating ⅓ sphere of the spherical depth map.

In addition, as shown in FIG. 6A (utilizing the image device 200 to describe, wherein the minimum view angle MFOV of the each image capturer of the image capturers 202, 204, 206 is equal to 240 degree), an image overlapping area OV1 exists between a view angle FOV1 of the image capturer 202 and a view angle FOV2 of the image capturer 204, so a first image pair exists between images captured by the image capturer 202 and the image capturer 204, wherein the first image pair corresponds to the image overlapping area OV1. Similarly, a second image pair exists between images captured by the image capturer 204 and the image capturer 206, wherein the second image pair corresponds to an image overlapping area OV2, and a third image pair exists between images captured by the image capturer 202 and the image capturer 206, wherein the third image pair corresponds to an image overlapping area OV3. Therefore, the depth map generator 110 can utilize the first image pair to obtain depth information of 1/3 (because the image overlapping area OV1 corresponds to a 120 degree angle) sphere S1 (as shown in FIG. 6B) of a spherical depth map according to a non-plane projection method (e.g. a spherical projection method or a cylindrical projection method), wherein the spherical projection method is obvious to one of ordinary skill in the art, so further description thereof is omitted for simplicity. Similarly, the depth map generator 110 can also utilize the second image pair to obtain depth information of 1/3 (because the image overlapping area OV2 corresponds to a 120 degree angle) sphere S2 (as shown in FIG. 6B) of the spherical depth map according to the spherical projection method, and utilize the third image pair to obtain depth information of 1/3 (because the image overlapping area OV3 corresponds to a 120 degree angle) sphere S3 (as shown in FIG. 6B) of the spherical depth map.

However, as shown in FIG. 6A, because the minimum view angle MFOV of the each image capturer of the image capturers 202, 204, 206 is equal to 240 degree, an invalid area IV1 (because the invalid area IV1 only corresponds to a first image captured by the image capturer 202, the depth map generator 110 cannot generate any depth information according to the first image captured by the image capturer 202) corresponding to the image capturer 202 appears within the view angle FOV1 of the image capturer 202. Similarly, an invalid area IV2 corresponding to the image capturer 204 appears within the view angle FOV2 of the image capturer 204, and an invalid area IV3 corresponding to the image capturer 206 appears within the view angle FOV3 of the image capturer 206. As shown in FIG. 6A, because current optical centers C1, C2, C3 are located within the invalid area IV1, the invalid area IV2, and the invalid area IV3 respectively, when the depth map generator 110 utilizes the 1/3 sphere S1, the 1/3 sphere S2, and the 1/3 sphere S3 to generate the spherical depth map, the spherical depth map will have the invalid area IV1, the invalid area IV2, and the invalid area IV3. Therefore, the depth map generator 110 can convert the current optical centers C1, C2, C3 into virtual optical centers VC1, VC2, VC3 respectively according to depth information of the 1/3 sphere S1, the 1/3 sphere S2, and the 1/3 sphere S3, wherein the above-mentioned conversion of the current optical centers C1, C2, C3 is obvious to one of ordinary skill in the art, so further description thereof is omitted for simplicity. In one embodiment of the present invention of the present invention, the virtual optical center VC1 is a vertex of the image overlapping area OV1, the virtual optical center VC2 is a vertex of the image overlapping area OV2, and the virtual optical center VC3 is a vertex of the image overlapping area OV3.

In addition, as shown in FIG. 6A, because the virtual optical centers VC1, VC2, VC3 are not located within the invalid area IV1, the invalid area IV2, and the invalid area IV3, when the depth map generator 110 utilizes the 1/3 sphere S1, the 1/3 sphere S2, and the 1/3 sphere S3 to generate the spherical depth map, errors of the spherical depth map are reduced.

In addition, in another embodiment of the present invention, the depth map generator 110 can convert the current optical centers C1, C2, C3 into a virtual optical center VC (as shown in FIG. 6A) according to the depth information of the 1/3 sphere S1, the 1/3 sphere S2, and the 1/3 sphere S3, wherein the virtual optical center VC is a geometric center of the current optical centers C1, C2, C3.

To sum up, the image device utilizes a plurality of fisheye image capturers which have a sum of view angles not less than 720 degree to generate a panorama depth map or a spherical depth map, or when overlapping vision fields between the plurality of fisheye image capturers cover 360 degree, the image device utilizes images corresponding to the overlapping vision fields to generate the panorama depth map. Therefore, the present invention can effectively reduce a number of the plurality of fisheye image capturers to reduce cost of the image device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An image device for generating a 360 degree depth map, comprising:

a plurality of image capturers, wherein an image pair captured by each two adjacent image capturers of the plurality of image capturers is used for generating the 360 degree depth map, and a sum of all view angles of the plurality of image capturers is not less than a sum of 720 degree and all angles required for compensating assembly errors of the plurality of image capturers;

wherein the image pair captured by the each two adjacent image capturers corresponds to image overlapping areas of two images captured by the each two adjacent image capturers, rather than whole areas of the two images captured by the each two adjacent image capturers;

wherein a minimum view angle of each image capturer of the plurality of image capturers is determined by a number of the plurality of image capturers, an angle required for compensating an assembly error of the each image capturer, and 720 degree.

2. The image device of claim 1, further comprising:

a depth map generation circuit coupled to the plurality of image capturers for generating the 360 degree depth map according to the image pair captured by the each two adjacent image capturers of the plurality of image capturers.

3. The image device of claim 2, wherein the depth map generation circuit generates the 360 degree depth map according to the image pair captured by the each two adjacent image capturers and a plane projection method, or according to the image pair captured by the each two adjacent image capturers and a non-plane projection method.

4. The image device of claim 2, wherein when the 360 degree depth map is a panorama depth map, the plurality of image capturers comprise at least three image capturers, and the depth map generation circuit utilizes the image pair captured by the each two adjacent image capturers of the plurality of image capturers to generate the panorama depth map.

5. The image device of claim 4, wherein each image capturer of the at least three image capturers is a fisheye image capturer.

6. The image device of claim 2, wherein when the 360 degree depth map is a spherical depth map, the plurality of image capturers comprise at least three image capturers, and the depth map generation circuit utilizes the image pair captured by the each two adjacent image capturers of the plurality of image capturers to generate the spherical depth map.

7. The image device of claim 6, wherein each image capturer of the at least three image capturers is a fisheye image capturer.

8. The image device of claim 6, wherein the depth map generation circuit converts at least three current optical centers corresponding to the at least three image capturers into at least one virtual optical centers.

9. The image device of claim 6, wherein when the depth map generation circuit converts at least three current optical centers corresponding to the at least three image capturers into at least three virtual optical centers, the at least three virtual optical centers are vertexes of overlapping areas of at least three image pairs captured by the at least three image capturers, respectively.

* * * * *